Jan. 27, 1925.

T. L. KENNEY

LOOM

Filed June 21, 1923

Inventor:
Thomas L. Kenney.
By his Attorney,
Charles C. Gill

Jan. 27, 1925. 1,524,398
T. L. KENNEY
LOOM
Filed June 21, 1923 10 Sheets-Sheet 2
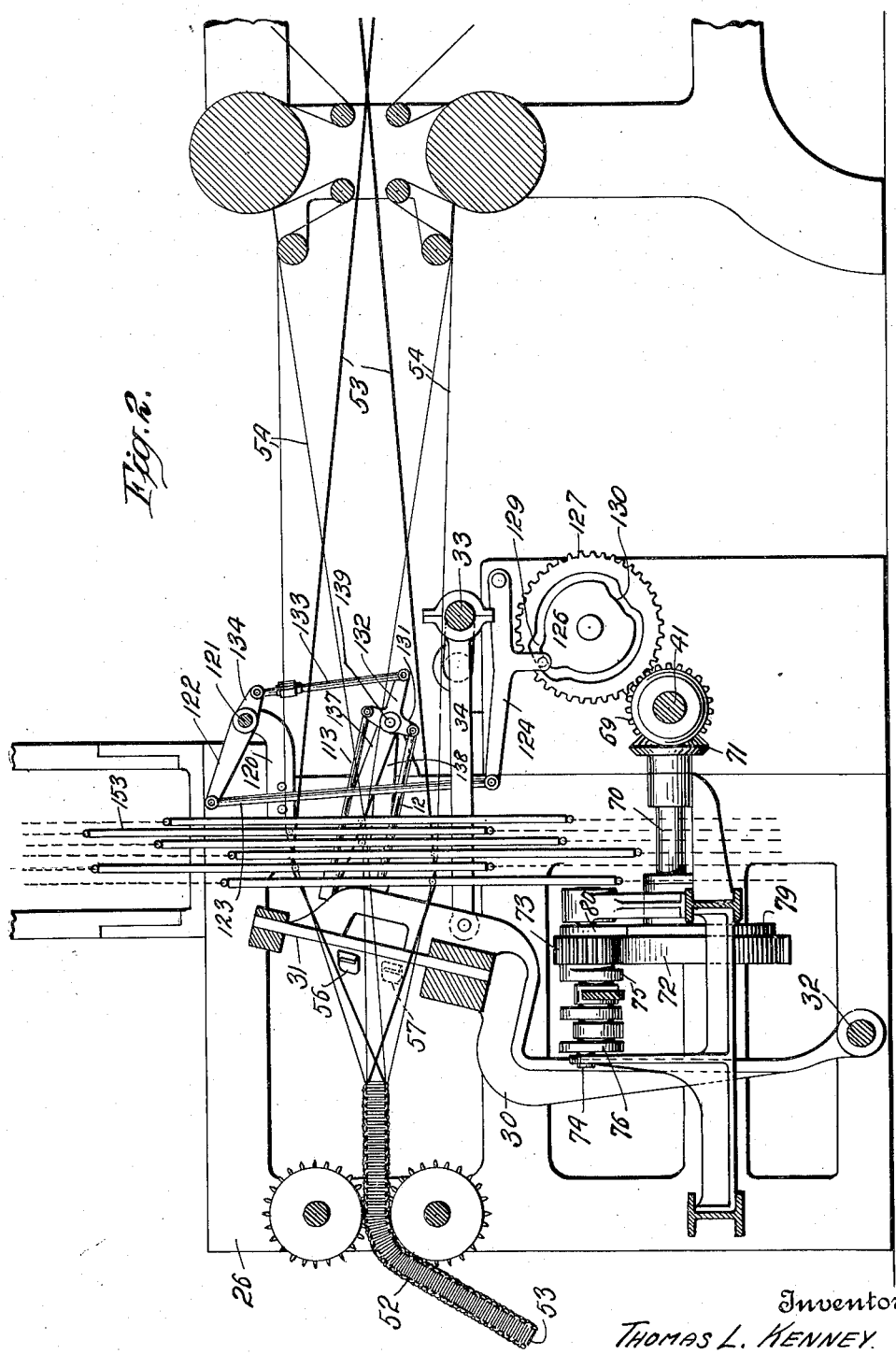
Inventor:
Thomas L. Kenney.
By his Attorney,
Charles C. Gill.

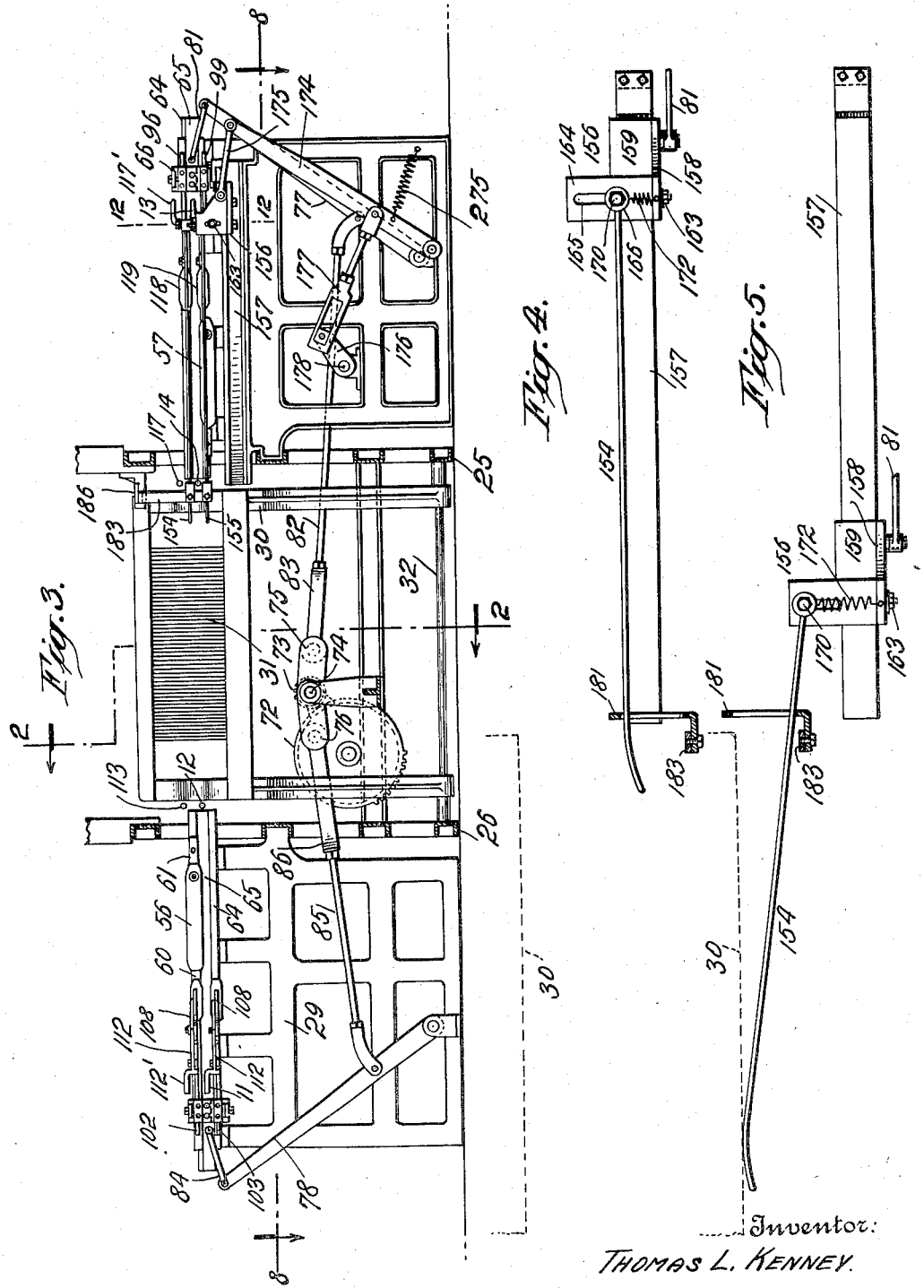

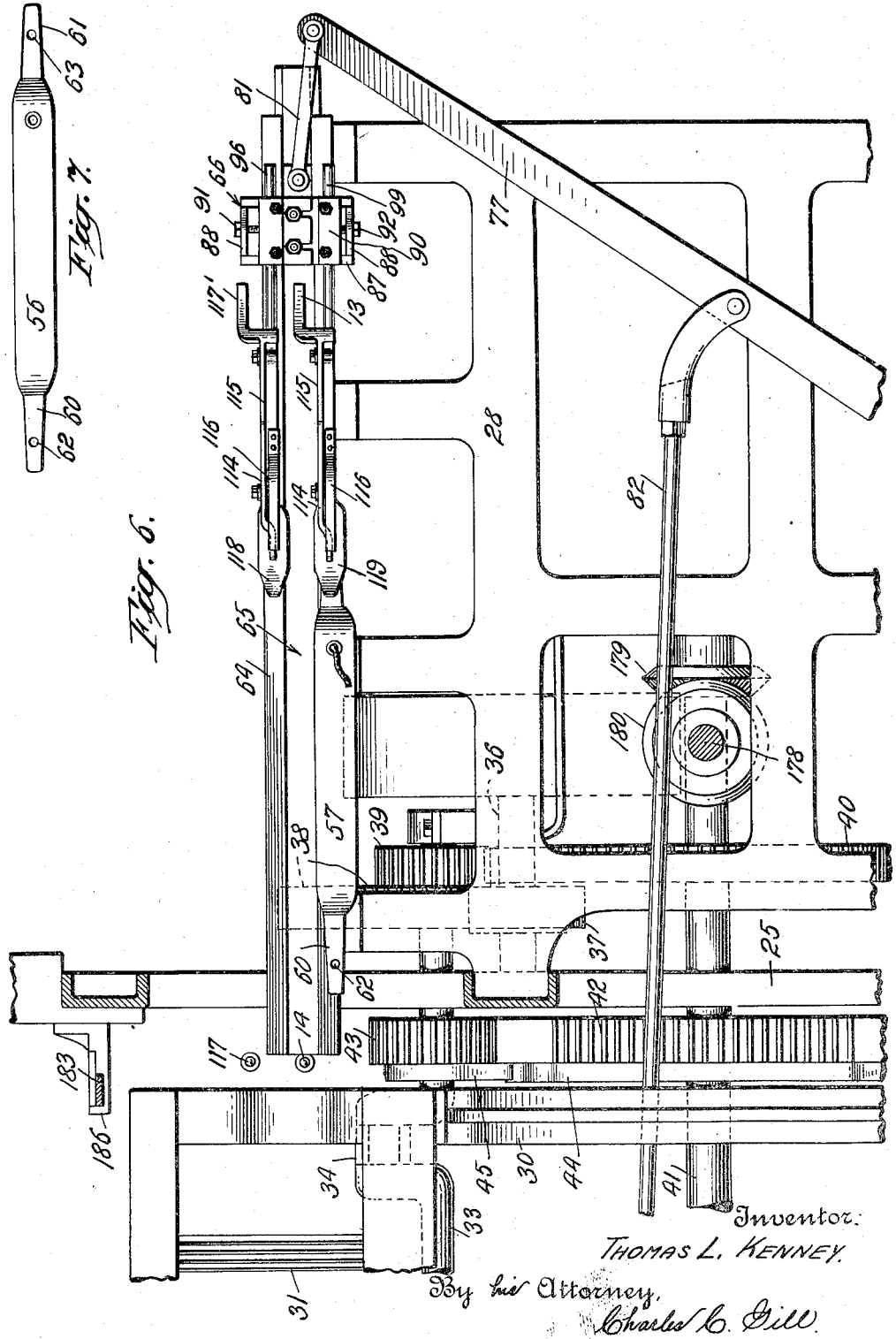

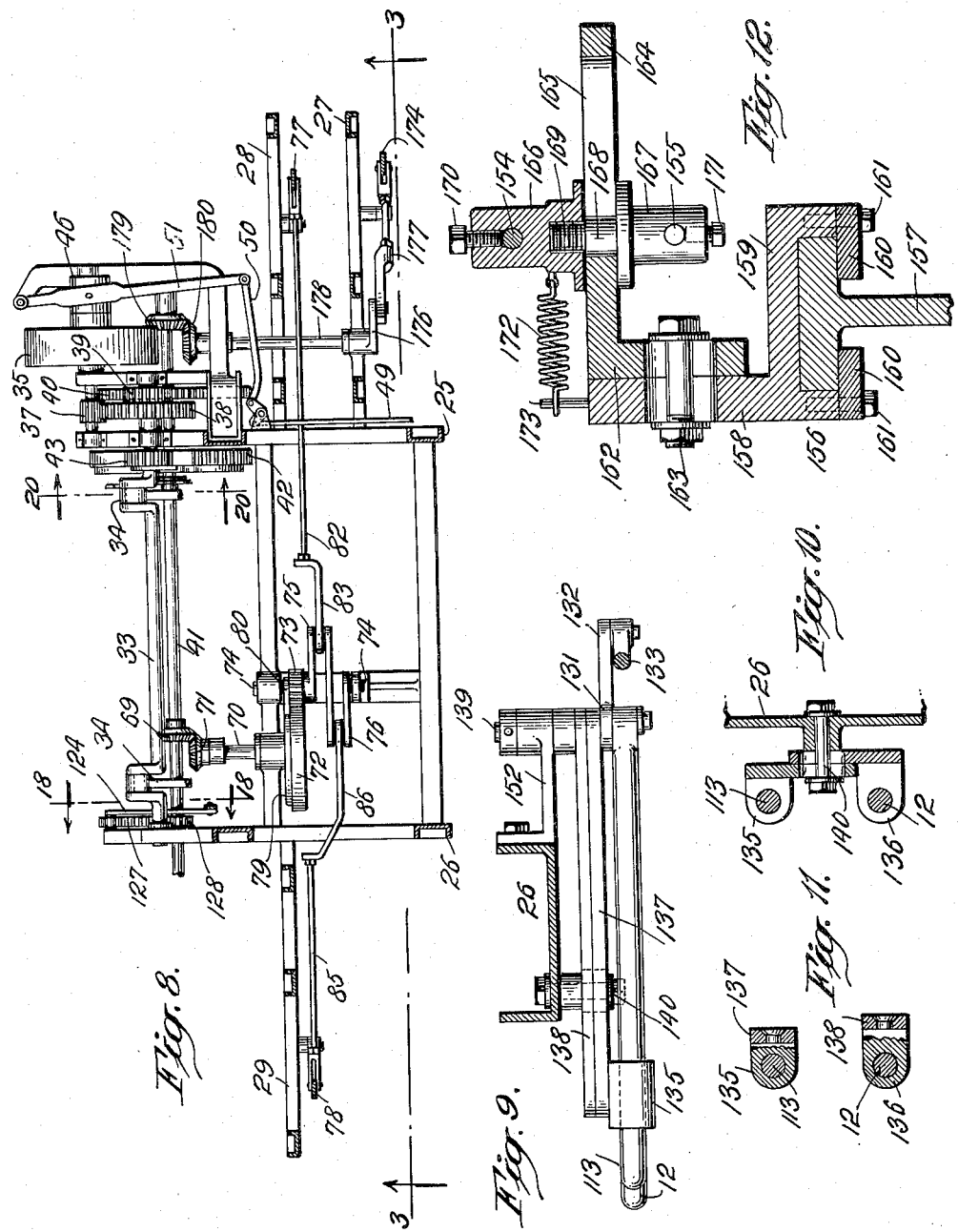

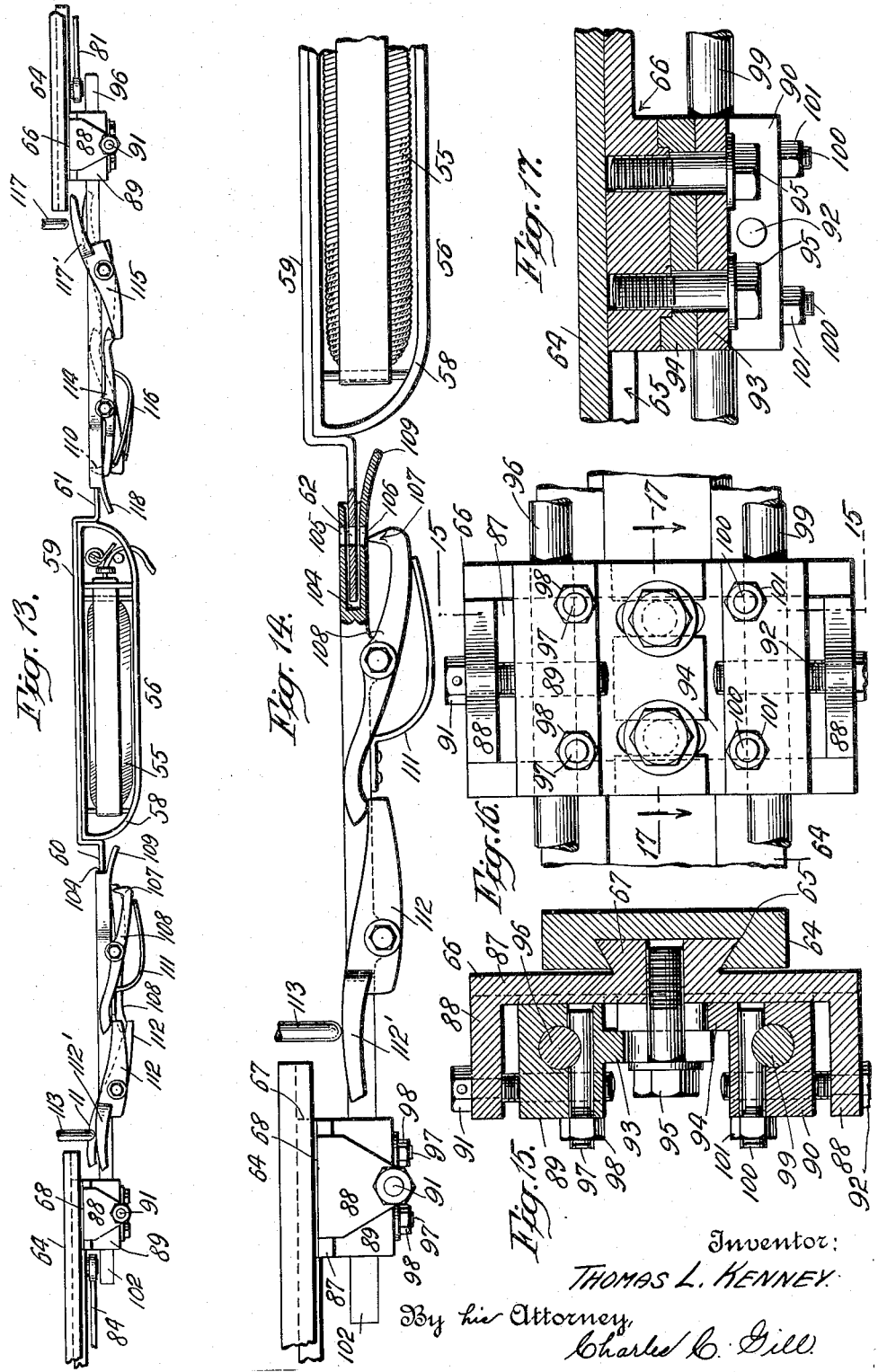

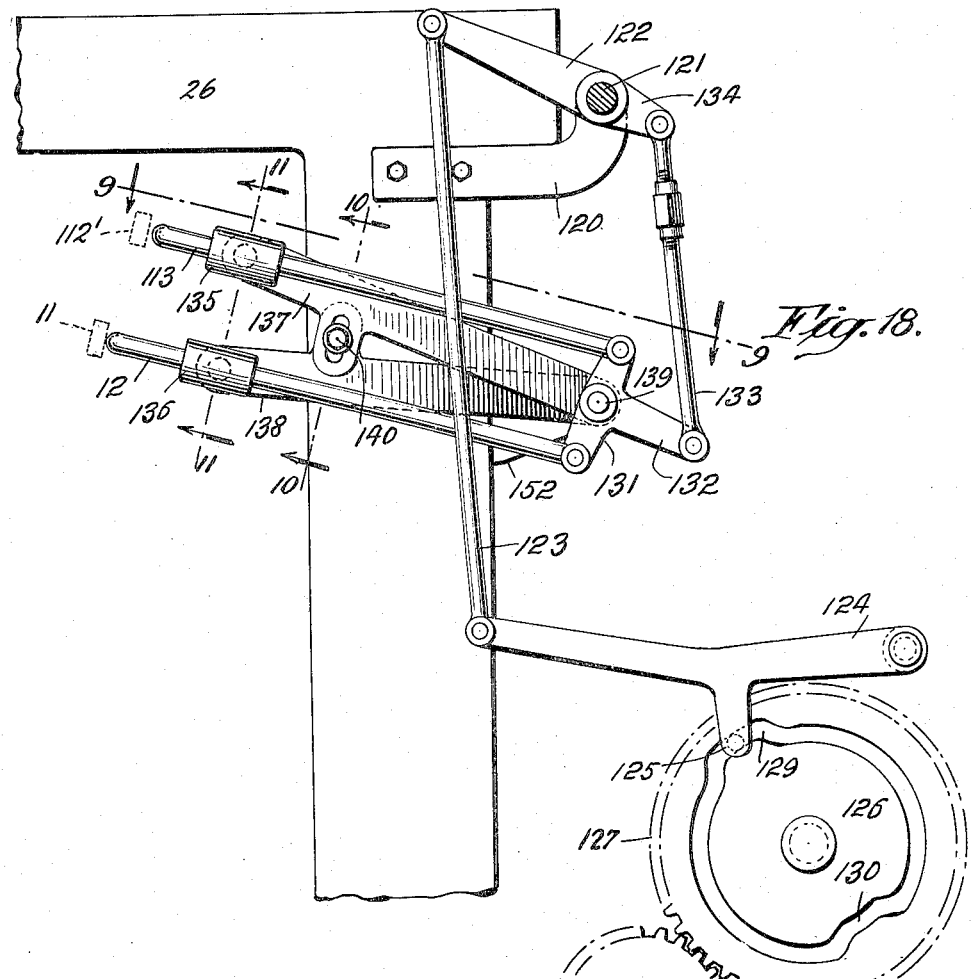
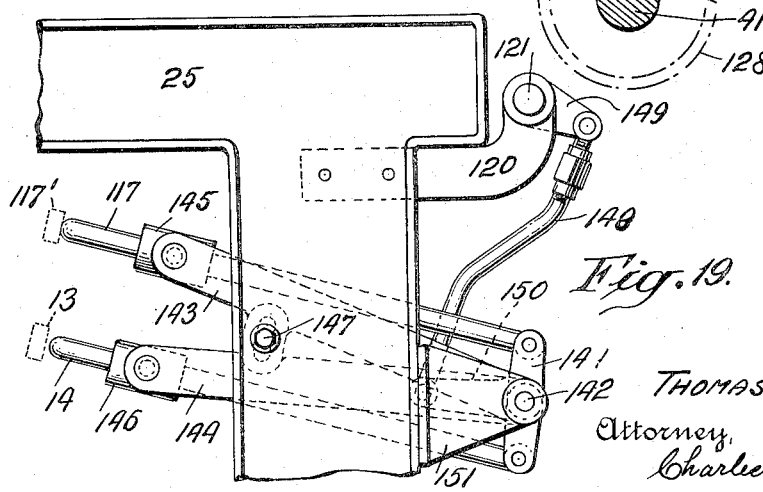

Jan. 27, 1925.
T. L. KENNEY
LOOM
Filed June 21, 1923   10 Sheets-Sheet 8
1,524,398
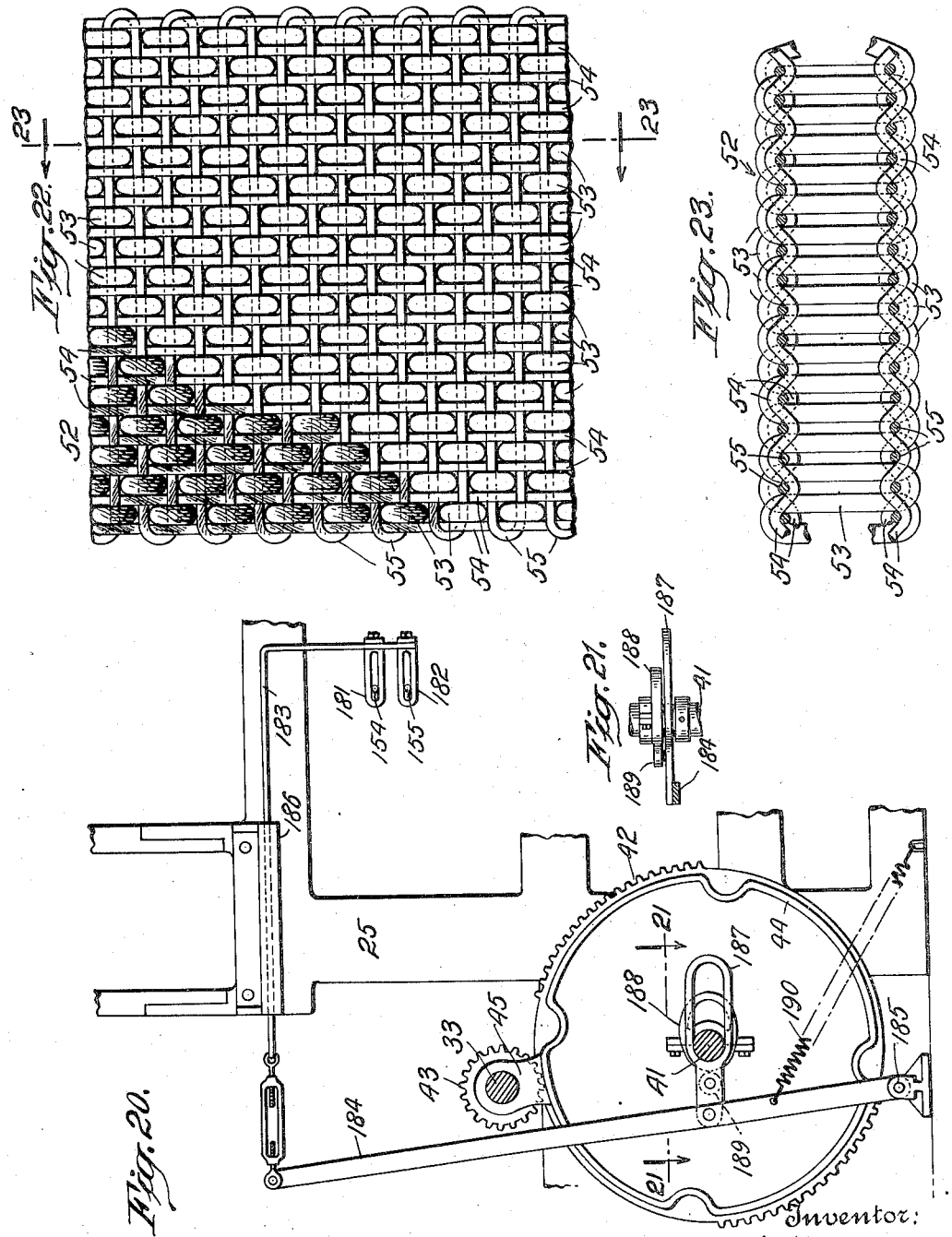
Inventor:
THOMAS L. KENNEY.
By his Attorney,
Charles C. Gill.

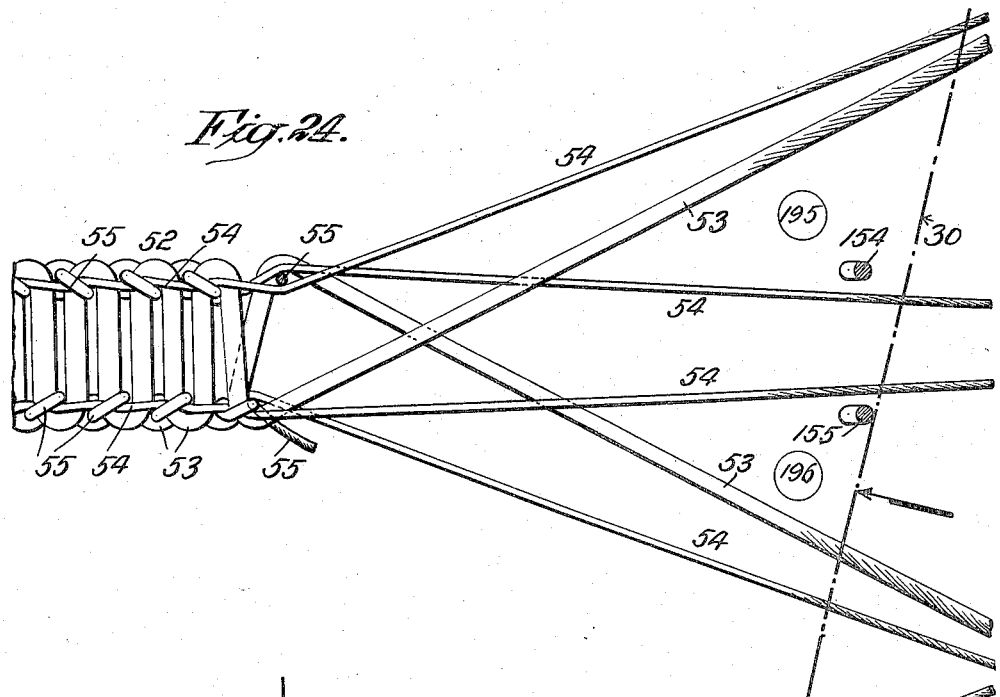
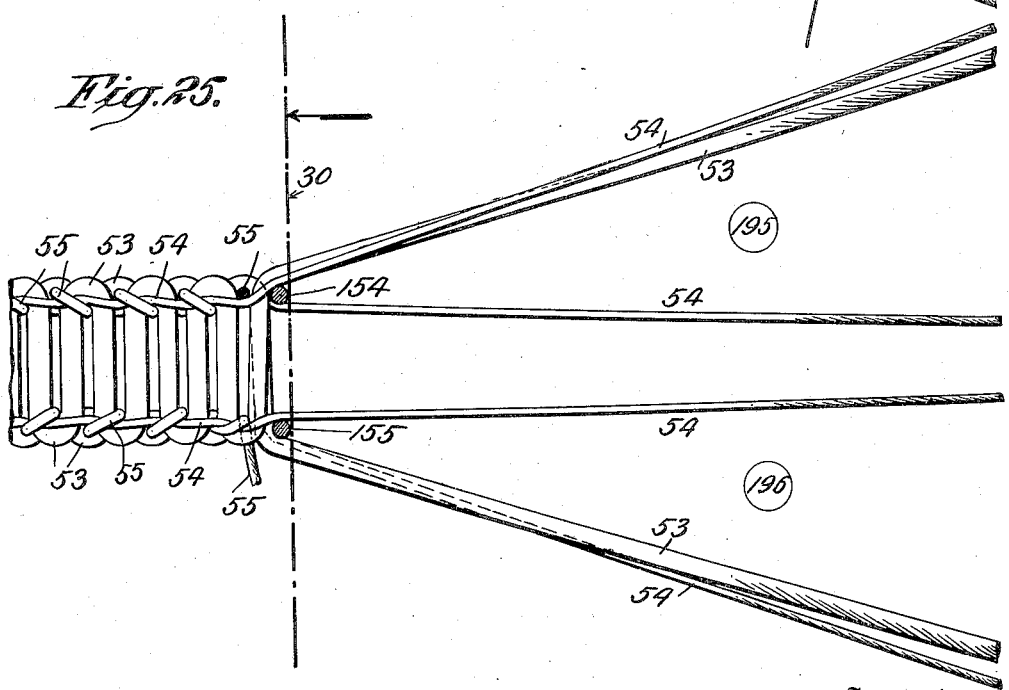

Jan. 27, 1925.  
T. L. KENNEY  
LOOM  
Filed June 21, 1923   10 Sheets-Sheet 10
1,524,398
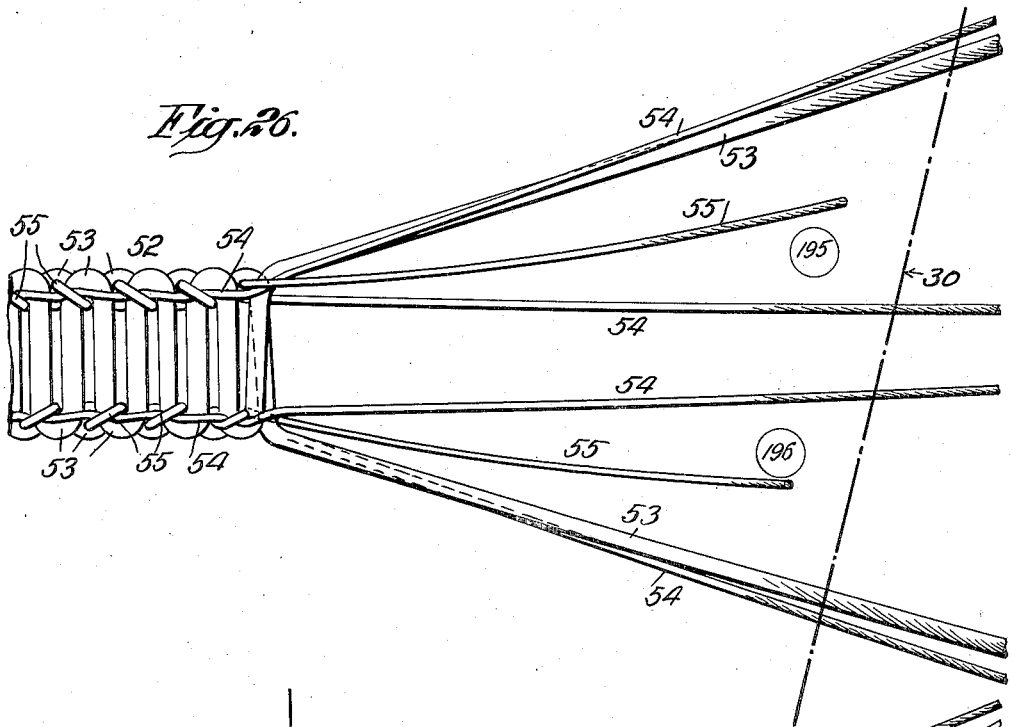
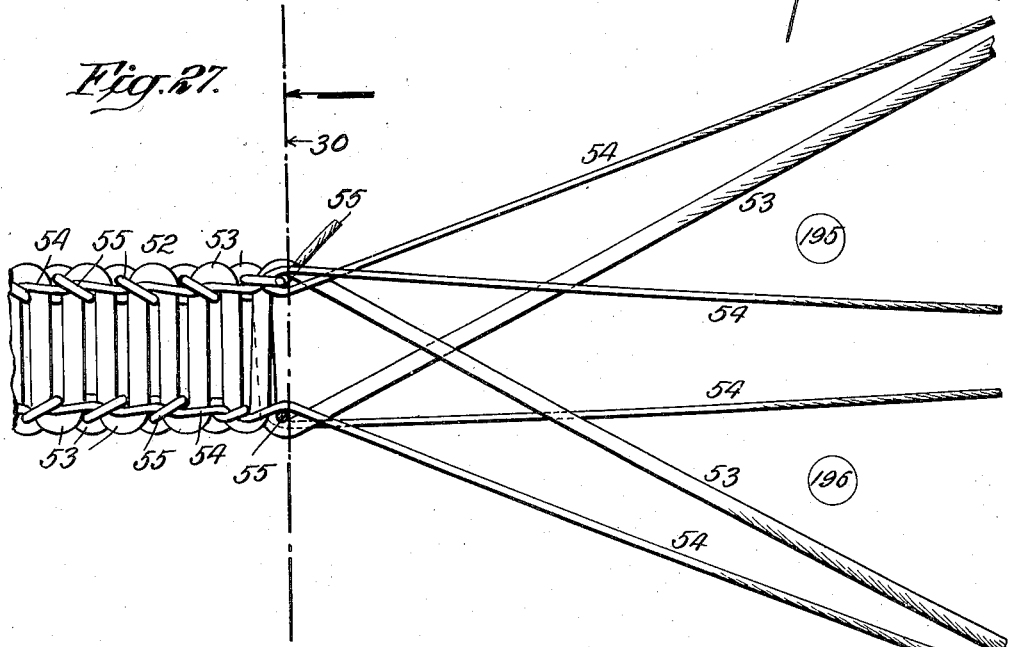
Inventor:  
Thomas L. Kenney.  
By his Attorney.  
Charles C. Gill.

Patented Jan. 27, 1925.

1,524,398

UNITED STATES PATENT OFFICE.

THOMAS L. KENNEY, OF BROOKLYN, NEW YORK, ASSIGNOR OF ONE-HALF TO JOSEPH WILD & COMPANY, OF NEW YORK, N. Y., A COPARTNERSHIP COMPOSED OF HENRY MacKAY, CHARLES F. CARTLEDGE, JOHN N. BOYD, AND HENRY MacKAY, JR., AND ONE-HALF TO DARRAGH SMAIL & COMPANY LIMITED, OF NEW YORK, N. Y., A CORPORATION OF GREAT BRITAIN.

LOOM.

Application filed June 21, 1923. Serial No. 646,785.

*To all whom it may concern:*

Be it known that I, THOMAS L. KENNEY, a citizen of the United States, and a resident of Brooklyn, in the county of Kings and State of New York, have invented certain new and useful Improvements in Looms, of which the following is a specification.

The invention pertains to looms for weaving fabrics from coir yarn, cocoanut fibre and the like, and particularly to looms for weaving a double-pile fabric or one having two corresponding face sides connected by a suitable length of tufting warp filler strands, the fabric as made being suitable for use as cushions or buffers and also being capable of being transversely slit through its filler strands to produce floor mats and the like.

The general purpose of the invention is to provide a power loom which may be successfully and commercially used for weaving heavy and unwieldy yarns or threads of the kind employed for cocoa matting, floor mats and the like.

A further purpose of the invention is the production by means of the loom, of a double pile fabric of special weave adapted to increase the period of usefulness of articles made therefrom.

A further purpose of the invention is to provide efficient shuttle operating mechanism adapted to the requirements of coarse weft yarn or threads in weaving a double-pile fabric, and in the present instance the loom of my invention has upper and lower shuttles to travel in reverse directions through the upper and lower sheds and means for projecting each shuttle from its side of the loom into its shed a certain distance and means for then withdrawing the shuttle through its shed for the balance of its travel. My invention embraces special means for connecting the shuttle with its primary propelling device and then automatically releasing the shuttle therefrom at the moment when in the shed it becomes connected with the device for withdrawing it the balance of the distance through the shed.

The loom of my invention also embodies certain rods adapted to be thrust into the sheds of the weave and receive the beat of the lay at the upper and lower faces of the fabric preparatory to the shuttles laying the upper and lower weft strands to be given the locations on the following beat of the lay, previously occupied by the said rods, said rods and shuttles having special cooperative action in producing an efficient fabric of uniform thickness and general character.

The fabric produced on my loom comprises upper and lower weft threads, two sets of comparatively heavy warp pile threads, two sets of upper warp binder threads and two sets of lower warp binder threads, the said pile threads and upper and lower binder threads being side by side in alternating relation and the binder threads being of less thickness than the pile threads. The upper sets of binder warp threads are crossed and recrossed, by means of the heddles, around the upper successive weft strands and the lower sets of binder warp threads are likewise crossed and recrossed around the lower successive weft strands. The upper and lower sets of warp pile strands are crossed and recrossed by means of the heddles to alternately fold upon the upper and lower weft threads and connect the upper and lower faces or face sides of the fabric, said faces or face sides being suitably separated from each other by definite lengths of the pile threads.

The invention will be fully understood from the detailed description hereinafter presented, reference being had to the accompanying drawings, in which:

Fig. 2 is a vertical longitudinal section, partly broken away, taken on the dotted line 2—2 of Fig. 3;

Fig. 3 is a front elevation, partly broken away and partly in section of the same, the section being on the dotted line 3—3 of Fig. 8;

Figure 1:
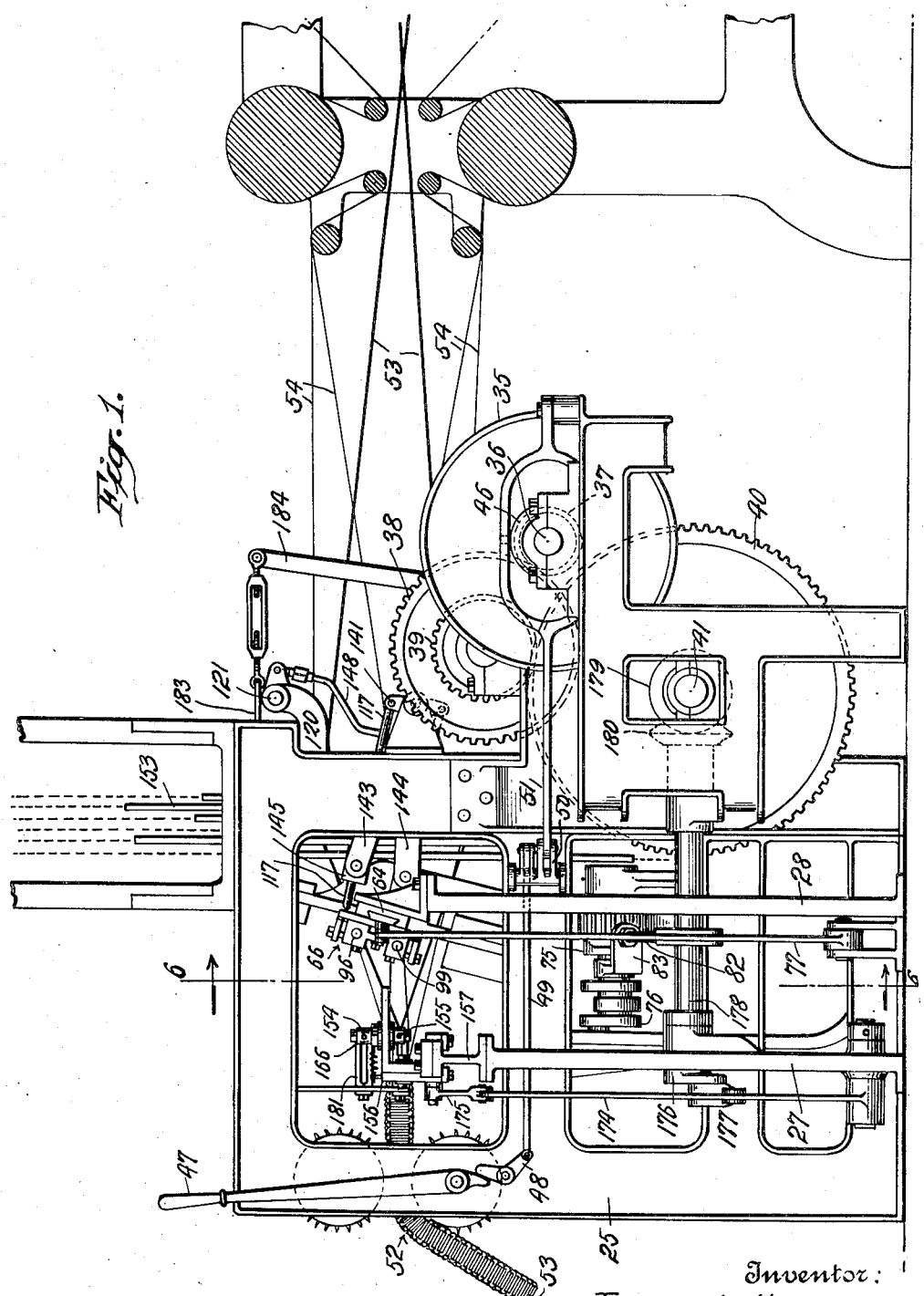
Fig. 1 is a side elevation, partly broken away and partly in section, of a loom embodying the invention.

Figs. 4 and 5 are plan views, partly in section, of one of two corresponding rods employed in the weaving operation, Fig. 4 showing the rod in its outward or withdrawn position and Fig. 5 illustrating the rod in its inner operative position; the dotted lines 30 in Figs. 4 and 5 indicate the relation of the lay frame to said rod in the two positions of the rod;

Fig. 6 is a vertical transverse section through the loom taken on the dotted line 6—6 of Fig. 1;

Fig. 7 is a detached side elevation of one of the shuttles;

Fig. 8 is a horizontal section through the loom taken on the dotted line 8—8 of Fig. 3;

Fig. 9 is a transverse section through a part of the operative mechanism of the loom, taken on the dotted line 9—9 of Fig. 18;

Fig. 10 is a vertical section through the same, taken on the dotted line 10—10 of Fig. 18;

Fig. 11 is a vertical section through the same, taken on the dotted line 11—11 of Fig. 18;

Fig. 12 is a vertical transverse section, on a larger scale, through a portion of the loom, taken on the dotted line 12—12 of Fig. 3;

Fig. 13 is a top view, partly broken away, of the shuttle operating mechanism of the loom;

Fig. 14 is a top view, on a larger scale and partly in section, of a portion of the same;

Fig. 15 is a vertical longitudinal section through a portion of the loom, taken on the dotted line 15—15 of Fig. 16;

Fig. 16 is a front elevation, on a larger scale, of a portion of the mechanism of the loom, the same portion being shown on a smaller scale at the upper right hand end of Fig. 3;

Fig. 17 is a horizontal section through the same, taken on the dotted line 17—17 of Fig. 16;

Fig. 18 is a vertical longitudinal section, on a larger scale, through a portion of the mechanism, taken on the dotted line 18—18 of Fig. 8;

Fig. 19 is a side elevation, on a larger scale, of a part of the operative mechanism shown somewhat obscurely and on a reduced scale in Fig. 1; Fig. 18 shows shuttle tripper mechanism located adjacent to one side frame of the loom, and Fig. 19 illustrates cooperating and substantially similar shuttle tripper mechanism located adjacent to the other side frame of the loom;

Fig. 20 is a vertical longitudinal section, on a larger scale, through a portion of the operative mechanism of the loom, taken on the dotted line 20—20 of Fig. 8;

Fig. 21 is a horizontal section through a part of the same, taken on the dotted line 21—21 of Fig. 20;

Fig. 22 is a top view of a portion of the fabric produced on the loom;

Fig. 23 is a vertical section through the same, taken on the dotted line 23—23 of Fig. 22;

Figs. 24, 25, 26 and 27 are edge views of a portion of the fabric produced on the loom and respectively illustrate the stages of one complete cycle of operations in the method of weaving the same.

In the drawings 25, 26 designate the two main supporting longitudinal side frames of the loom and 27, 28 two laterally extending supporting frames located at the right hand side of the loom (Fig. 8), while 29 denotes a laterally extending supporting frame located at the left hand side of the loom.

30 designates the lay frame carrying the reeds 31, said frame being adapted to have an oscillatory movement, as usual, and being pivotally supported at its lower end on a transverse rod 32. The lay frame 30 receives its motion from a crank shaft 33 which is connected by links 34 with the sides of said frame (Figs. 2 and 8) and receives an intermittent rotation from the belt wheel 35 and main driving shaft 36 through intermediate transmission mechanism comprising a pinion wheel 37 on said shaft, an idler gear wheel 38 in mesh with said pinion, an idler pinion 39 rigid with said idler gear wheel, a gear wheel 40 in mesh with said idler pinion and rigid on a transverse shaft 41, a mutilated gear wheel 42 on said transverse shaft (Figs. 6, 8 and 20) and a pinion wheel 43 on the crank shaft 33 and receiving intermittent motion from said gear wheel 42, said gear wheel 42 having two oppositely disposed sets of teeth to engage the pinion 43 and impart the proper movements to the lay frame through the shaft 33 and links 34, and said gear wheel and pinion respectively having a rim 44 and a lock 45 constituting a known form of Geneva movement for holding the pinion wheel 43 and crank shaft 33 stationary except when the teeth of the gear wheel 42 engage said pinion 43 for the purpose of rotating it and said crank shaft to effect the throwing of the lay frame.

The belt wheel 35 will be equipped with a usual clutch 46 operable from the front of the loom by means of a hand lever 47 (Fig. 1) through ordinary connections 48, 49, 50 and 51 (Figs. 1 and 8) requiring no special description.

The fabric produced on the loom is indicated at 52 (Figs. 1 and 2 and Figs. 22 to 27 inclusive) and, as shown, this fabric has corresponding upper and lower faces connected by heavy pile yarns 53. The fabric 52 is formed of said pile yarns or strands 53 which travel lengthwise from suitable bobbins or cops, not shown, warp yarns or strands 54, which also feed longitudinally from suitable bobbins or cops, not shown, and weft yarns or strands 55 which are on bobbins carried transversely by upper and lower shuttles 56, 57, respectively, (Figs. 3, 6, 7, 13, 14) whose construction and operative connections constitute important features of my invention.

The fabric 52 having the double faces may be used for many known purposes, and said fabric may be sawed centrally between said faces and through the pile 53 to form cocoa mats, which when cut to size will be bound, as usual.

The upper and lower shuttles 56, 57 are spaced apart to form the faces of the fabric 52 and provide for a sufficient length of pile 53 connecting said faces to serve for two mats or other purpose.

The shuttles 56, 57 are of corresponding construction and their relative positions when at rest are at opposite sides of the lay 30, as indicated in Fig. 3. Each shuttle comprises an ordinary frame or housing 58 for the bobbin of weft yarn 55 (Figs. 13, 14) and a bar 59 secured to one flat face of said frame or housing 58 and having end members or tongues 60, 61, respectively, projecting in line with and beyond the ends of the shuttle and respectively having apertures 62, 63, (Fig. 7). I provide special mechanism for moving the shuttles 56, 57 back and forth through the shed. Each shuttle is pushed to the middle of the shed by one set of devices operating from one side of the loom and then released therefrom and seized by another set of devices and drawn to the other side of the loom by mechanism operating from that side of the loom.

Upon each side frame 28, 29 is rigidly supported a horizontal transverse guide bar 64 having a long dovetail groove 65 (Figs. 3 and 6) for guiding the shuttle operating mechanism. On the right hand guide bar 64 is mounted a slidable head 66 (Figs. 3, 6, 13, 15, 16 and 17) having a dove-tail tongue 67 to slide in the groove 65 of said bar 64, and on the left hand guide bar 64 is mounted a similar head 68 to slide on said bar. The heads 66, 68 have corresponding details shown more clearly in Fig. 6 and Figs. 14 to 17 inclusive, and said heads are given a timed movement toward and from each other from the shaft 41 through intermediate mechanism comprising a bevel gear wheel 69 on said shaft (Figs. 2, 8), a short longitudinal shaft 70 having on its rear end a bevel gear wheel 71 in mesh with said wheel 69 and on its front end a mutilated gear or segment 72, a pinion wheel 73 to be operated from said gear 72 and secured on a shaft 74 having two oppositely disposed cranks 75, 76, respectively, and levers 77, 78, respectively, connected with said cranks and said heads 66, 68. The pinion wheel 73 is locked against operation except when engaged by the teeth of the gear 72 by a usual form of Geneva movement comprising a rim 79 on the gear 72 and an arm 80 on the pinion 73 (Figs. 2 and 8).

The lever 77 is pivoted at its lower end and connected at its upper end by a link 81 with the head 66, and said lever 77 is connected at an intermediate portion thereof by link members 82, 83, with the crank 75. The lever 78 is pivoted at its lower end and at its upper end is connected by a link 84 with the head 68, and said lever 78 at an intermediate portion thereof is connected by link members 85, 86 with the crank 76. When the crank shaft 74 is rotated the cranks 75, 76 thereof act through their link connections on the levers 77, 78 to slide the heads 66, 68 toward and from each other along the guide bars 64, this being for the purpose of moving the shuttles 56, 57 toward each other, on planes one above the other, and into and from the shed, as hereinafter more fully explained.

The head 66 and head 68 are of corresponding construction and the details of this construction are more clearly shown in Figs. 15, 16 and 17. The head 66 comprises a back-plate 87 having forwardly extending upper and lower ears 88 and the back dovetail section 67 to guide in the groove 65 of the right hand guide-bar 64. Within the head 66 are upper and lower clamping members 89, 90, respectively, which are adjustably fastened in place by means of bolts 91, 92, respectively, extending through the aforesaid ears 88. The upper clamping member 89 has a downwardly extending slotted section 93 which laps upon an upwardly extending slotted section 94 forming a part of the clamping member 90 and through the slots of said sections 93, 94 extend bolts 95 which enter the back-plate 87 of the head 66 and serve to clamp said sections 93, 94 in position and thereby aid in positively securing the clamping members 89, 90 in such position as may be given to them. The clamping members 89, 90 may be adjusted toward and from each other by means of the bolts 91, 92 and then secured in fixed adjusted position by means of the bolts 95, as will be readily understood on reference to Figs. 15, 16 and 17. The clamping member 89 has extending through a horizontal transverse aperture the outer end of the upper shuttle rod 96, and this shuttle rod is rigidly secured to the clamping member 89 by means of bolts 97 which have transverse concave recesses on their upper sides closely fitting the lower surface of the adjacent portions of the rod 96. There are two of the bolts 97, as shown in Fig. 16, and these bolts may be tightly clamped against the rod 96 by means of the nuts 98 on the outer ends of said bolts and engaging the face of the clamping member 89, the tightening of the nuts 98 against the member 89 resulting in the bolts 97 being drawn forwardly and in the rear curved surfaces of the recesses in said bolts, where they engage the rod 96, binding said rod against the forward wall of the aperture through which the rod extends. The bolts 97 are clamping bolts and when loosened by a reverse rotation of the nuts 98 allow the rod 90 to be adjusted longitudinally through the clamping member 89.

The clamping member 90 carries the lower shuttle rod 99 which is below and of the same construction as the upper shuttle rod 96. The clamping member 90 is provided with clamping bolts 100 and nuts 101 thereon corresponding exactly with the upper clamping bolts 97 and nuts 98 and operating in the same way to permit the adjustment of the rod 99 and then to clamp said rod rigidly to the member 90. The shuttle rods 96, 99 may thus be adjusted longitudinally of themselves and they may be adjusted toward and from each other by means of the bolts 91, 92 and finally they become secured in fixed relation to each other within the head 66 by means of the clamping bolts 97, 100 and by means of the clamping bolts 95.

The clamping head 68 has the identical construction which has just been described with respect to the head 66 and I will therefore for the purpose of identification place a few of the same reference numerals on the head 68 as I have on the head 66, without repeating in detail the parts of the head 68. The head 68 carries an upper shuttle rod 102 corresponding and in horizontal line with the upper shuttle rod 96 carried by the head 66, and said head 68 also carries a lower shuttle rod 103 corresponding exactly with the lower shuttle rod 99 carried by the head 66. The upper shuttle rod 102 extends inwardly transversely of the loom and is shown more clearly in Fig. 14. The rod 102 is formed at its inner end with a socket 104 adapted to receive the projecting arm 60 on the shuttle 56, and said rod 102 at its inner end is formed with transverse apertures 105 and 106 aligning with the aperture 62 in said arm 60 of the shuttle 56, said apertures 105, 106 and 62 being adapted to receive the hook 107 formed on the pivoted lever 108 secured to and carried by the rod 102. The inner end of the rod 102 is formed with a deflecting lip 109 which serves to guide the arm 60 of the shuttle 56 into the socket 104 of said rod 102. The hook 107 is used at the proper time to enter the apertures 105, 106 and 62 for the purpose of securely connecting the shuttle 56 with the rod 102, so that said rod may effect the travel of said shuttle. When the lever 108 is turned on its pivot so as to withdraw the hook 107 from the apertures 105, 106 and 62, the shuttle 56 becomes released from the rod 102 and will, at its other end, at the same time be caught by a similar hook 110 carried by the upper right hand rod 96, as I illustrate in Fig. 13. Fig. 13 shows the shuttle 56 as released from the hook 107 of the left hand upper rod 102 and engaged by the hook 110 of the right hand upper rod 96. The lever 108 is spring-pressed, by means of a spring 111, to throw the hook 107 into the apertures 105, 106 and 62, and the pressure of said spring 111 is overcome when it is desired to release the shuttle 56 from the rod 102, by means of a pivoted lever 112 carried by the rod 102 and at the time pressed against, at its tail end 112', by a pin 113, whose operation is timed, as hereinafter fully explained, to act against the lever 112 to throw the lever 108 into its releasing position just at the time when the shuttle 56 has reached the middle of the shed and is caught by the right hand upper rod 96 and withdrawn toward the right from the shed. The inner end of the lever 112 engages the heel of the lever 108, as shown in Fig. 14, and it will be readily seen in Fig. 14 that if the pin 113 presses against the tail member 112' of the pivoted lever 112, the inner end of said lever will act against the heel of the lever 108 and throw the hook 107 outwardly from the apertures 105, 106 and 62.

The upper right hand shuttle rod 96 carries a pivoted lever 114 corresponding with the pivoted lever 108 connected with the rod 102 and also carries a pivoted lever 115 corresponding with the lever 112 of the rod 102 and employed for the purpose of tripping the lever 114 in opposition to the stress of the spring 116 for withdrawing the hook 110 from the aperture 63 in the projecting arm 61 of the shuttle 56. In Fig. 13 I illustrate the position of the parts when the shuttle arm 61 is engaged with the upper shuttle rod 96 preparatory to the shuttle being drawn to the right by said rod 96, and at the proper time during the succeeding inward throw of the rod 96 the lever 115 is tripped by a pin 117 to turn the lever 114 on its pivot and withdraw the hook 110 from the shuttle arm 61, said pin 117 then being pressed against the member 117' of said lever 115. The shuttle rod 96 and its operative parts are the same as the like parts connected with the shuttle rod 102 shown in Fig. 14, the inner end of the shuttle rod 96 being formed with a socket to receive the shuttle arm 61 corresponding with the socket shown at 104 in Fig. 14. If we assume that the shuttle 56 is connected with the upper left hand shuttle rod 102 and is at the left hand side of the loom, in the position shown in Fig. 3, it is to be understood that the rod 102 will be moved inwardly by the lever 78 to carry the shuttle half way through the shed and that at the same time the upper right hand shuttle rod 96 is moved inwardly by the lever 77 to thrust its inner socketed end upon the right hand arm 61 of the shuttle 56 or to the position shown in Fig. 13, the shuttle then being released from the left hand rod 102 by the tripping of the levers 112, 108 and engaged by the hook 110 of the left hand shuttle rod 96, which will then be moved outwardly toward the right under the influence of the lever 77 and draw the shuttle 56 the rest of the distance through the shed and to the right hand side of the loom. The upper left hand rod 102 has thus pushed the shuttle 56 from the left hand side of the loom into about the middle portion of the shed and then released the shuttle, which is caught by the inner end of the upper right hand shuttle rod 96 and pulled toward the right the rest of the distance through the shed. On the next succeeding operation of the shuttle 56, said shuttle is pushed from the right hand side of the loom into the shed by the rod 96 and then released and at the time of release said shuttle is caught by the inner end of the upper left hand rod 102 and pulled through the shed and to the left hand side of the loom. The rods 102 and 96 move toward and from each other in unison, one rod moving inwardly to drive the shuttle partly through the shed and the other moving inwardly to seize the shuttle and draw it the rest of the distance through the shed.

The lower left hand shuttle rod 103 corresponds with the upper shuttle rod 102 and is equipped with the same mechanism, to-wit: a lever 108 and a lever 112 of the exact construction shown in Fig. 14 and at its inner end said rod 103 is formed with a socket to receive the left hand arm 60 of the lower shuttle 57 in the same manner that the upper rod 102 receives the left hand arm of the shuttle 56, as shown in Fig. 14. The lower shuttle rod 103 and its parts are identical with the upper shuttle rod 102 and its parts, and said parts connected with the lower shuttle rod are indicated in Fig. 13. The lever 112 of the lower rod 103 has a tail member 11 which is engaged by a pin 12 (Fig. 18) when said lever is tripped to effect the release of the shuttle 57 from the rod 103.

The lower shuttle rod 99 at the right hand side of the loom is identical with the upper shuttle rod 96 and it is equipped with a trip-lever 115 and a locking lever 114 (Fig. 6) of the exact construction shown in Fig. 13. The inner end of the upper shuttle rod 96 is equipped with a deflecting member 118 corresponding with the member 109 of the shuttle rod 102, and the lower shuttle rod 99 is equipped at its inner end with a corresponding deflecting member 119. The lever 115 of the lower shuttle rod 99 has a tail member 13 to be engaged by a pin 14 (Fig. 19) when said lever is to be tripped to effect the release of the shuttle 57 from the lower rod 99. The upper and lower shuttle rods 96, 102 and 99, 103 correspond in every detail with one another, except that the rods 96, 99 point inwardly toward the left and the rods 102 and 103 point inwardly toward the right. The upper rods 96, 102 operate the upper shuttle 56 in a manner that has been explained, and the lower rods 99 and 103 operate the lower shuttle 57 in the same manner that the upper rods operate the upper shuttle 56, with the understanding however that when the shuttle 56 is moved transversely through the loom from one side thereof, the shuttle 57 is simultaneously moved through the loom from the other side thereof so that said shuttles cross each other in their path through the shed. If we consider Fig. 3, it may be explained that the shuttle 57 is at the right hand side of the loom and that through the action of the crank shaft 74 and lever 77 the rod 99 is caused to move the shuttle 57 into the shed and that at the same time the lever 78 causes the rod 103 to move into the shed and interlock upon the left hand arm of the shuttle 57 while the right hand arm thereof becomes released from the rod 99, this action being followed by the rod 103 withdrawing the shuttle 57 to the left hand side of the loom and in the rod 99 returning idly to the right hand side of the loom. When the shuttle 57 moves from its position shown in Fig. 3 to the left hand side of the loom, the shuttle 56 is caused to travel, as hereinbefore described, from the left hand side of the loom to the right hand side thereof, and these reverse back and forth movements of the shuttles are repeated during the entire operation of the loom.

The position of the tripping pins 113 and 12 at the left hand side of the loom and of the tripping pins 117 and 14 at the right hand side of the loom is indicated in Fig. 3, in which the forward ends of said pins are shown. The upper pin 113 is projected forwardly to release the shuttle 56 from the rod 102 when said rod has moved said shuttle toward the right and into the shed, and the pin 12 is moved forwardly to release the shuttle 57 from the rod 103 when said rod has moved said shuttle toward the right and into the shed, and this position of the pin 12 is shown in Fig. 18. The tripping pin 117 is pressed forwardly when it is desired to release the shuttle 56 from the upper shuttle rod 96 after said rod has moved said shuttle toward the left and into the shed, and this position of the pin 117 is shown in Fig. 19. The lower right hand tripping pin 14 is moved forwardly when it is desired to release the shuttle 57 from the shuttle rod 99 after said rod has forced the shuttle inwardly into the shed. When the tripping pin 113 moves forwardly, the pin 12 retires rearwardly, and when the pin 117 moves forwardly, the pin 14 retires rearly, the upper and lower pins at each side of the loom being alternately moved forwardly and rearwardly, as will be understood on reference to Figs. 18 and 19.

The mechanism for operating the pins 113, 12 and 117, 14, will be fully understood on reference to Figs. 9, 10, 11, 18 and 19. At the inner side of each side frame 25, 26 is secured a bracket 120, the two brackets corresponding with each other and being shown in Figs. 18 and 19. The brackets 120 support a rock-shaft 121, and upon this rock-shaft adjacent to the frame 26 is secured a two-armed lever 122, one end of which is connected by a link 123 with a pivoted lever 124 carrying a roller 125 in the groove of a cam wheel 126 from which the lever 124, link 123, lever 122 and rock-shaft 121 receive timed movements. The cam 126 is on a gear-wheel 127 which is rotated from a pinion 128 secured on the main actuating shaft 41. The cam 126 has an outwardly extending groove-section 129 which acts through the lever 124 to move the link 123 upwardly when said section is passing the roller 125, and said cam 126 has an inwardly set groove-section 130 which acts when passing the roller 125 to draw the link 123 downwardly. The link 123 thus has alternate upward and downward movements at spaced periods and these movements I utilize to turn the rock-shaft 121 in one direction and in the other direction. The pins 113, 12 are pivotally connected with a three-armed lever 131 whose arm 132 is pivotally connected by a link 133 with the short arm 134 of the lever 122 and receives motion from said arm 134. The other two arms of the lever 131 are respectively pivoted to the rear ends of the pins 113, 12, whose forward portions extend through guiding sleeves 135, 136, respectively, which are swiveled on diverging arms 137, 138, respectively, whose rear ends are brought together and pivotally held on a pin 139 extending through the lever 131 and supported by a bracket 152 secured to the main frame 26. The arms 137, 138 have a bolt and slot connection 140 by which said arms may be adjusted with relation to each other and secured in adjusted position, the adjustment being for the purpose of spacing the forward ends of the pins 113 and 12 in proper relation to act upon the members 112' and 11 of the shuttle mechanism. During the upward movement of the link 123, the rear end of the lever 122 is turned downwardly, and this imparts a downward movement to the link 133 which acts to turn the lever 131 downwardly at its arm 132, and this results in the pin 12 being thrust forwardly against the tripping member 11, as shown in Fig. 18, and in the pin 113 being retired rearwardly to an inoperative position. When the link 123 moves downwardly, it reverses the action of the lever 131 and then the pin 113 is thrust forwardly against the tripper member 112' and the pin 12 is retired rearwardly from the tripping member 11. The pins 113 and 12 are operated alternately, one pin being moved to operative position and the other retired to inoperative position.

The pins 117 and 14 shown in Fig. 19, have a reverse operation to the pins 113, 12, in that the upper pin 117 is thrust forwardly at a time when the upper pin 113 is retired rearwardly and that the lower pin 14 is retired rearwardly at the time the pin 12 is moved forwardly, as will be understood on reference to Figs. 18 and 19. The pins 117, 14 are pivotally secured at their rear ends to a three-armed rockable lever 141 mounted on a pin 142 supported by a bracket 151 and securing two-arms 143, 144 together at their rear ends, these arms being the equivalent of the arms 137, 138 shown in Fig. 18. The rear ends of the pins 117 and 14 are respectively pivotally secured to the upper and lower ends of the lever 141 (Fig. 19), and said pins at their forward portions extend through swiveled sleeves 145, 146 carried by the arms 143, 144 and corresponding with the aforesaid swiveled sleeves 135, 136. The arms 143, 144 have a bolt and slot connection 147 to admit of their adjustment toward and from each other for the purpose of positioning the pins 117 and 14 in due relation to the tripper members 117' and 13. The lever 141 has a forwardly extending arm 150, shown by dotted lines in Fig. 19, which is pivotally connected with the lower end of a link 148 whose upper end is secured to a lever arm 149 secured on the rock-shaft 121. When the rock-shaft 121 is operated from the cam 126, the link 148 has upward and downward movements and imparts through the lever arm 150 oscillatory motion to the lever 141, which acts to alternately move the pins 117 and 14 connected with it forwardly and rearwardly.

It is believed that the mechanism for releasing the shuttles 56, 57 from their respective carrying rods will be fully understood from the explanation given. The tripping mechanism located adjacent to the left hand side frame 26 is illustrated in Figs. 2 and 18, and the tripping mechanism adjacent to the right hand side frame 25 is shown in part in Fig. 1 and fully in Fig. 19.

The heddles are numbered collectively 130

153 and these heddles are of usual type and will be operated from the main shaft 41 through intermediate heddle mechanism of familiar character not necessary to be shown or described in this application. In the present instance I make use of six heddles, as shown in Fig. 2.

A further feature of the loom is the presence therein of two transversely extending rods 154 and 155 whose normal initial position with relation to the lay 30 is indicated in Figs. 3 and 4, and whose operative position when in the shed of the loom and in the path of the lay 30, is indicated in Figs. 5 and 24. The rods 154, 155 are made use of during the weaving and in Fig. 24 I illustrate these rods as having passed into the shed and in Fig. 25 as having by means of the lay beam 30 been pressed into the weave at the upper and lower surfaces of the fabric. After the rods 154, 155 have been subjected to the beat of the lay 30, they are withdrawn to their position shown in Fig. 3, and thereafter at the proper time they are again projected into the shed or to the position shown in Fig. 24 so that on the subsequent beat of the lay said rods may be driven to the position shown in Fig. 25 and perform their function of aiding in the weaving of the fabric. The rods 154, 155 are heavy wire rods and they are carried by a head 156 shown in Figs. 1, 3, 4 and 5 and in detail in Fig. 12, this head being slidably mounted on the upper flange of an I-beam 157 secured upon the upper edge of the wing 27 of the main frame of the loom. The head 156 comprises a face member 158 (Fig. 12) having a right angle base 159 which rests and may slide upon the upper flange of the I-beam 157 and is held thereon by retaining strips 160 and bolts 161, as shown in Fig. 12. To the face member 158 of the head 156 is secured a right angle member 162 which forms a part of the head and is secured to the face member 158 thereof by means of the bolt 163 which passes through slots in said members 158, 162 to admit of the vertical adjustment of the member 162, so as to correctly position the rods 154, 155 with respect to the upper and lower faces of the fabric 52. The member 162 has a rearwardly extending horizontal plate 164 containing a slot 165 and supporting a vertical post 166 from which is suspended a like inverted post or hanger 167, the post 167 having a stem 168 extending within the aforesaid slot 165, and this stem having a threaded end 169 which screws into a threaded socket in the base of the post 166, as clearly represented in Fig. 12. The post 166 has secured within it by means of a set-screw 170 the outer or right hand end portion of the wire rod 154, and the inverted post 167 has secured within it by means of a set-screw 171 the outer or right hand end portion of the wire rod 155. The slot 165 in the arm 164 permits the posts 166 and 167 to be slid rearwardly and forwardly, as occasion may require, with respect to the positioning of the rods 154, 155. The posts 166, 167 are normally held at the forward end of the slot 165 by means of a spring 172 connected with the post 166 and with a pin 173 on the member 158 of the head 156.

The head 156 has a horizontal transverse reciprocatory motion along the I-beam 157 and this motion is imparted to said head 156 by means of a lever 174 which is pivotally mounted at its lower end and at its upper end is connected with the head 156 by a link 175, as shown in Fig. 3. The lever 174 is connected with a spring 275 tensioned to turn the lever to its initial position shown in Fig. 3. The lever 174 at an intermediate point thereof is connected with a crank member 176 by means of a slotted link connection 177, said crank being on a driving shaft 178. During the rotation of the shaft 178 and revolving motion of the crank 176, the link 177 imparts oscillatory motion to the lever 174 for sliding said head 156 inwardly toward the shed and outwardly to its normal position shown in Fig. 3. The link connection 177 is slotted so as to permit a definite amount of lost motion in the lever 174 so that when the rods 154, 155 are in their operative position shown in Figs. 24, 25 and 5, said rods may be allowed to remain stationary, so far as lateral reciprocation is concerned, and that thereafter upon the conclusion of the beat of the lay 30, as indicated in Fig. 25, the head 156 may retire toward the right and withdraw the rods 154, 155 with it and hold said rods stationary until they must again pass into the shed. The shaft 178 carrying the crank arm 176 is shown in side elevation in Fig. 1, while the lever 174 is shown in right hand edge view. The shaft 178 derives its motion from the main actuating shaft 41 through intermediate beveled gear-wheels 179, 180, respectively, secured on said shafts, as shown in Figs. 1 and 8. The shaft 178 has a constant rotation, but by reason of the slotted link connection 177 allowing lost motion in the lever 174, said lever during its stroke toward the left is permitted to rest while the rods 154, 155 are in the shed of the weave and also to remain at rest after the rods 154, 155 have been withdrawn from the shed preparatory to their again being driven into the shed. The initial position of the rods 154, 155 with relation to the lay 30, is shown in Figs. 3 and 4 and the initial operative position of the rods 154, 155 when thrust into the shed is illustrated in Figs. 5 and 24.

The rods 154, 155 receive their transverse reciprocating movement from the oscillatory lever 174, as hereinbefore described, and said rods 154, 155 also have a movement rearwardly from the position indicated in Fig. 4 to that illustrated in Fig. 5, and forwardly back to the position shown in Fig. 4, the normal initial position of the rods 154, 155 to the lay beam 30 being shown in Fig. 4 and the rearward movement of said rods in a direction toward the lay 30 being shown in Fig. 5. The mechanism for moving the rods 154, 155 rearwardly and forwardly is shown more clearly in Figs. 20 and 21. The rods 154, 155 are, adjacent to their free ends, when in their initial position, engaged by slotted plates 181, 182, respectively, which are carried by a bent slidable arm 183 whose rear end is pivotally connected with the upper end of a lever 184 whose lower end is pivoted to a stationary abutment at 185, said bar 183 being adapted for rearward and forward sliding movement through a guide 186 and receiving its sliding movement from the lever 184. The lever 184 has pivoted to it a slotted plate 187 through which the shaft 41 passes, and upon this shaft 41 is secured a cam 188 which acts against a roller 189 carried by the plate 187. During the rotation of the shaft 41 the cam 188 rotates against the roller 189 of the arm 187 and therethrough imparts oscillatory motion to the lever 184. When the projecting portion of the cam 188 moves against the roller 189, the lever 184 is turned rearwardly and moves the slotted plates 181, 182 rearwardly against the rods 154, 155, with the result that said plates at the forward ends of their slots engage said rods and move them rearwardly, as shown in Fig. 5. The rods 154, 155 may be moved rearwardly, since the posts 166, 167 securing them are slidable along the slot 165 in the plate 164. The spring 172 will return the posts 166, 167 back to their initial position shown in Fig. 12, and the spring 190 (Fig. 20) acts to restore the lever 184 and bent arm 183 carrying the slotted plates 181, 182 to their initial position when permitted so to do by the cam 188. The slotted plates 181, 182 act against the rods 154, 155 at the time said rods are to be thrust into the shed, so that said rods will take the inclined position illustrated in Fig. 5 and correctly enter the shed at the front of and adjacent to the lay-beam 30, as shown in Fig. 24. The rods 154, 155 on the forward beat of the lay-beam 30 are by said beam moved into the upper and lower surface weaves of the fabric or to the position shown in Fig. 25, and after the beat, the rods 154, 155 are withdrawn laterally toward the right to their initial position by means of the lever 174 and head 156.

The essential mechanical parts of the loom and the mechanism for operating them have been hereinbefore described.

The precise method of weaving the fabric 52 may be more fully understood on reference to Figs. 22 to 27 inclusive. The fabric 52 has upper and lower corresponding faces, as shown, connected together by the heavy pile warp yarns or threads 53, 53, and said faces are formed by the folds or knuckles of said yarns or threads 53, 53 and by the finer warp yarns or threads 54, 54 and weft yarns or threads 55, 55. There are two series of the pile yarns 53 and during the weaving they become crossed successively and recrossed as shown in Figs. 24 and 27 and are alternately folded over the upper and lower weft threads or yarns 55 respectively to produce the effect shown in Figs. 22, 23. There are two series of upper and two series of lower finer warp yarns or threads 54, 54 and 54, 54, and these warp yarns or threads may be called binder yarns or threads. The two sets of upper yarns or threads 54, 54 cross and recross each other around the upper lines of the weft thread 55 and remain at the upper face of the fabric, and the two sets of lower yarns or threads 54, 54 cross and recross each other around the lines of the lower weft thread 55 and remain at the lower face of the fabric. The upper weft thread 55 always remains at the upper face of the fabric and the lower weft thread 55 always remains at the lower face of the fabric.

The pile warp threads 53 alternate with the binder warp threads 54 at both faces of the fabric, as shown in Fig. 22, and there is a binder thread 54 at each selvage edge of each face of the fabric.

Figs. 24, 25, 26 and 27 respectively illustrate the stages of one complete cycle of operations in the method of weaving the fabric.

In Fig. 24, the lay 30 is shown in its rear position and the rods 154, 155 are shown as having been respectively projected into the upper and lower sheds 195, 196 at the front of the lay 30, and in this situation the lay 30 had returned to its rear position after its beat against the weft threads or from the position shown in Fig. 27, and is ready to swing forwardly while the shuttles are stationary and before another line of weft threads is laid. In Fig. 25 I illustrate the next stage of the operation and therein it may be seen that the lay 30 has swung forwardly on its first beat and has driven the rods 154, 155, forwardly along the sheds 195, 196 and into the surfaces of the fabric on lines parallel with the previously laid weft threads, thereby closing the upper crossed threads 54, 54 around the upper weft thread and the lower crossed threads 54, 54 around the lower weft thread, and also closing the crossed pile threads 53, 53 into the fabric and around the previously laid upper and lower weft threads.

On the next stage of the operation, the rods 154, 155 are withdrawn endwise or toward the right (Fig. 3), the lay 30 is swung to its rear position, as shown in Fig. 26, and the upper and lower shuttles travel in reverse directions through the sheds 195, 196, and lay the upper and lower weft strands 55, 55 to take the position occupied in Fig. 25 by the rods 154, 155, which on the previous beat prepared the faces of the fabric to receive said strands. In Fig. 26 I indicate the upper weft thread 55 as crossing to the left hand side of the loom and the lower weft thread 55 as having crossed to the right hand side thereof.

The lay 30 then moves forwardly against the weft strands 55, as shown in Fig. 27, and then swings back to its position shown in Fig. 24. As the lay 30 starts back from the position shown in Fig. 27 to that shown in Fig. 24, the heddles change for a recrossing of the pile strands 53, 53, the upper binder strands 54, 54 and the lower binder strands 54, 54 from their relative positions shown in Fig. 26 to that shown in Fig. 27, the sets of upper pile strands 53 turning downwardly and the sets of lower strands 53 upwardly and said strands crossing, as shown in Fig. 27, the two sets of upper binder strands 54, 54 reversing positions and crossing each other and the two sets of lower binder strands 54, 54 reversing positions and crossing each other.

The stages of operation just described are repeated as continuously as may be desired and are automatically performed and the resultant fabric is that shown in Figs. 22, 23, comprising upper and lower faces connected by a suitable length of the pile warp strands 53, 53 to permit of said connecting length being cut through to divide the fabric into similar lengths which may thereafter be subdivided into suitable sizes for floor mats. The double-faced fabric is useful for many purposes without subdivision between its faces. In dividing up the fabric for floor mats it is preferable to secure a binding around the edge of the mat at the back surface thereof, and in dividing the fabric into sections to serve as buffers or cushions I have found it to be desirable to secure bindings around the upper and lower edges thereof.

What I claim as my invention and desire to secure by Letters Patent, is:

1. In a loom of the character described for weaving double-faced pile fabrics having a lay, heddles and means for supplying pile warp strands and binder warp strands, shuttle mechanism for delivering the weft strands through the upper and lower sheds comprising an upper shuttle carrying the upper weft thread, a lower shuttle carrying the lower weft thread, upper and lower shuttle carrier slides at opposite sides of the loom for operating said shuttles in reverse directions through the sheds, power driven means at each side of the loom for actuating said slides to move toward each other into the sheds and then outwardly therefrom, said shuttles having arms at their ends and said slides having latches to alternately engage and be released from the arms of their respective shuttles while in the sheds, one slide at each side of the loom moving a shuttle into a shed and the cooperating slide at the other side of the loom entering the shed and engaging the shuttle and withdrawing it the balance of the distance through the shed, and means for tripping the alternate latches of the upper and lower slides to release said shuttles from the slides moving them into the sheds and permit them to be pulled onward through the sheds by the other slides, the means for tripping the latches comprising at each side of the loom, upper and lower pins and means for alternately moving them to effect the release of said latches, the upper pin at one side of the loom and the lower pin at the opposite side of the loom acting on one movement of the shuttles and the alternate upper and lower pins acting on the next movement of the shuttles.

2. In a loom of the character described for weaving double-faced pile fabrics having a lay, heddles and means for supplying pile warp strands and binder warp strands, shuttle mechanism for delivering the weft strands through the upper and lower sheds comprising an upper shuttle carrying the upper weft thread, a lower shuttle carrying the lower weft thread, upper and lower shuttle carrier slides at opposite sides of the loom for operating said shuttles in reverse directions through the sheds, power driven means at each side of the loom for actuating said slides to move toward each other into the sheds and then outwardly therefrom, said shuttles having arms at their ends and said slides having latches to alternately engage and be released from the arms of their respective shuttles while in the sheds, one slide at each side of the loom moving a shuttle into a shed and the cooperating slide at the other side of the loom entering the shed and engaging the shuttle and withdrawing it the balance of the distance through the shed, and means for tripping the alternate latches of the upper and lower slides to release said shuttles from the slides moving them into the sheds and permit them to be pulled onward through the sheds by the other slides, said latches being pivoted and spring-pressed toward their operative position and said slides carrying levers for engaging said latches and moving them to their releasing position, said tripping mechanism being located at opposite sides of the loom exterior to the sheds and comprising, at each side of the loom, upper and lower pins and means for alternately moving said pins against said latch-levers to therethrough move said latches to releasing position, the upper pin at one side of the loom and the lower pin at the opposite side of the loom acting against their cooperating latch-levers on one movement of the shuttles and the alternate upper and lower pins acting against their cooperating latch-levers on the next movement of the shuttles.

3. In a loom of the character described for weaving double-faced pile fabrics having a lay, heddles and means for supplying pile warp strands and binder warp strands, shuttle mechanism for delivering the weft strands through the upper and lower sheds comprising an upper shuttle carrying the upper weft thread, a lower shuttle carrying the lower weft thread, upper and lower shuttle carrier slides at opposite sides of the loom for operating said shuttles in reverse directions through the sheds, power driven means at each side of the loom for actuating said slides, to move toward each other into the sheds and then outwardly therefrom, said shuttles having arms at their ends and said slides having latches to alternately engage and be released from the arms of their respective shuttles while in the sheds, one slide at each side of the loom moving a shuttle into a shed and the cooperating slide at the other side of the loom entering the shed and engaging the shuttle and withdrawing it the balance of the distance through the shed, and means for tripping the alternate latches of the upper and lower slides to release said shuttles from the slides moving them into the sheds and permit them to be pulled onward through the sheds by the other slides, the means for tripping the latches comprising at each side of the loom exterior to the shed, upper and lower forwardly projecting pins pivotally connected with opposite arms of a pivoted lever, guides for the forward portions of said pins and means operable from the driving shaft of the loom for rocking said levers in reverse directions, whereby the upper pin at one side of the loom and the lower pin at the other side of the loom are thrust forward to release opposite upper and lower latches on one movement of the shuttles and said pins are retired and the other alternate pins are thrust forward to release the alternate upper and lower latches on the next movement of the shuttles.

4. In a loom of the character described for weaving double-faced pile fabrics having a lay, heddles and means for supplying pile warp strands and binder warp strands, shuttle mechanism for delivering the weft strands through the upper and lower sheds comprising upper and lower shuttles and shuttle carrier slides at opposite sides of the loom for moving the shuttles in reverse directions, each slide moving a shuttle into the shed and releasing it to the opposite slide which pulls it the balance of the distance through the shed, upper and lower slidable transverse rods to be moved into the sheds in front of the lay and in line with the upper and lower wefts before the weft strands are laid and which receive the first beat of the lay, means for effecting the travel of the shuttles through the sheds after the beat against said rods and after the lay has retired and said rods have been withdrawn, the second beat of the lay then taking place against the weft strands, and means for operating the shuttle carriers, the lay and said rods in the timing indicated.

5. A loom as claimed in claim 4, in which said upper and lower transverse slidable rods are secured at their outer ends in a head mounted to slide on the loom framing and which head comprises a main body portion and an auxiliary slotted plate portion upon which is a post in which the end of one rod is secured by a set screw and from which is suspended an inverted post in which the end of the other rod is secured by a set screw, said posts being connected through the slot in the plate and slidable therein and having a spring normally holding them at the forward end of the slot, and in which means are provided for moving said rods rearwardly on their entrance into the sheds in front of the lay.

6. A loom as claimed in claim 4, having a laterally slidable head in which the outer ends of said rods are secured and which permit the rods to be moved backwardly and forwardly, slotted plates freely embracing said rods and mechanism timed with the lay and shuttle mechanism for moving said rods rearwardly to enter the wider portions of the sheds in front of the lay when the lay is in its rear position.

7. In a loom of the character described for weaving double-faced pile fabrics having a lay, heddles and means for supplying pile warp strands and binder warp strands, shuttle mechanism for delivering the weft strands through the upper and lower sheds comprising an upper shuttle carrying the upper weft thread, a lower shuttle carrying the lower weft thread, upper and lower shuttle carrier slides at opposite sides of the loom for operating said shuttles in reverse directions through the sheds, power driven means at each side of the loom for actuating said slides to move toward each other into the sheds and then outwardly therefrom, said shuttles having arms at their ends and said slides having latches to alternately engage and be released from the arms of their respective shuttles while in the sheds, one slide at each side of the loom moving a shuttle into a shed and the cooperating slide at the other side of the loom entering the shed and engaging the shuttle and withdrawing it the balance of the distance through the shed, and means for tripping the alternate latches of the upper and lower slides to release said shuttles from the slides moving them into the sheds and permit them to be pulled onward through the sheds by the other slides, said shuttle carrier slides at each side of the loom comprising two horizontal rods carrying said latches and a head slidable with said rods and in which the outer ends of the rods are secured, said head comprising a main body-portion, two vertically adjustable clamping members mounted therein and in which the rods are secured, means for adjusting said members vertically toward and from each other and means for adjusting said members with relation to the top and bottom of and securing them within said body portion.

8. In a loom of the character described for weaving double-faced pile fabrics, having a lay, heddles and means for supplying pile warp strands and binder warp strands, there being two series of crossing filler warp strands, two series of upper crossing binder warp strands and two series of lower crossing binder warp strands, the binder warp strands alternating at each face of the fabric with the filler warp strands, upper and lower shuttles for delivering the weft strands through the upper and lower sheds and between the upper two series of crossed binder warp strands and between the lower two series of binder warp strands, upper and lower slidable transverse rods to be moved into the sheds and between the upper crossed binder warp strands and between the lower binder warp strands at the front of the lay and in line with the upper and lower wefts before the successive weft strands are laid and which rods receive the first beat of the lay, means for effecting the travel of the shuttles in reverse directions through the sheds after the beat against said rods and after the lay has retired and said rods have been withdrawn, the second beat of the lay then taking place against the weft strands, and means for operating the shuttles, the lay and said rods in the timing indicated.

Signed at New York city, in the county of New York and State of New York, this 19th day of June A. D. 1923.

THOMAS L. KENNEY.